United States Patent [19]

Wevers et al.

[11] Patent Number: 4,679,102

[45] Date of Patent: Jul. 7, 1987

[54] METHOD AND MEANS FOR PARKING READ/WRITE HEADS IN A DISC DRIVE USING THE BACK-EMF OF THE SPINDLE MOTOR TO OPERATE A STEPPER MOTOR

[75] Inventors: William E. Wevers; James N. Krause, both of Santa Clara County; Ramgopal Battu, Los Angeles County, all of Calif.

[73] Assignee: Seagate Technology, Scotts Valley, Calif.

[21] Appl. No.: 800,060

[22] Filed: Nov. 20, 1985

[51] Int. Cl.$^4$ .......................... G11B 5/54; G11B 21/02
[52] U.S. Cl. ......................................... 360/75; 360/105
[58] Field of Search ..................... 360/69, 75, 78, 105, 360/77, 104, 97–99, 106; 318/685, 696

[56] References Cited

U.S. PATENT DOCUMENTS

| | | | |
|---|---|---|---|
| 3,518,651 | 6/1970 | Keeney | 360/75 |
| 3,702,997 | 11/1974 | Jamieson | 360/105 |
| 4,005,485 | 1/1977 | Opocensky | 360/105 |
| 4,237,501 | 12/1980 | Barmache et al. | 360/75 |
| 4,371,903 | 2/1983 | Lewis | 360/75 |

FOREIGN PATENT DOCUMENTS

| | | | |
|---|---|---|---|
| 53-85411 | 7/1978 | Japan | 360/75 |
| 58-45670 | 3/1983 | Japan | 360/75 |
| 2121589 | 12/1983 | United Kingdom | 360/105 |

Primary Examiner—Raymond F. Cardillo
Assistant Examiner—Steven R. Garland
Attorney, Agent, or Firm—Flehr, Hohbach, Test, Albritton & Herbert

[57] ABSTRACT

Electronic circuitry is provided to position the read/write heads in a designated landing zone when the electrical power is removed from the drive. When power is removed from the drive, the stored energy of the rotating spindle motor is used as a source of electrical power and timing pulses to the stepper motor which drives the actuator of the disc drive. The power generated by the spindle motor as it spins down is referred to as "back EMF." A sequencer circuit is provided to couple the power and clock pulses to selected windings of the stepper motor to cause the stepper motor to rotate in the direction necessary to move the transducer heads to a predetermined park position at the inner diameter of the disc whenever power is removed from the disc drive. Since the location of the heads at power down may not be known, the timing of the pulses is such that a sufficient number of steps will be tken to move the transducer heads to the parking zone within the time alloted even if the heads were at the outermost track. Step pulses will continue to be generated until the back EMF of the spindle motor is insufficient to generate such pulses. After the transducer heads are at the predetermined parking location, any additional steps will cause the actuator to contact a mechanical "inner crash stop" designed to prevent damage to the transducer heads from contact with the clamp which retains the discs.

16 Claims, 7 Drawing Figures

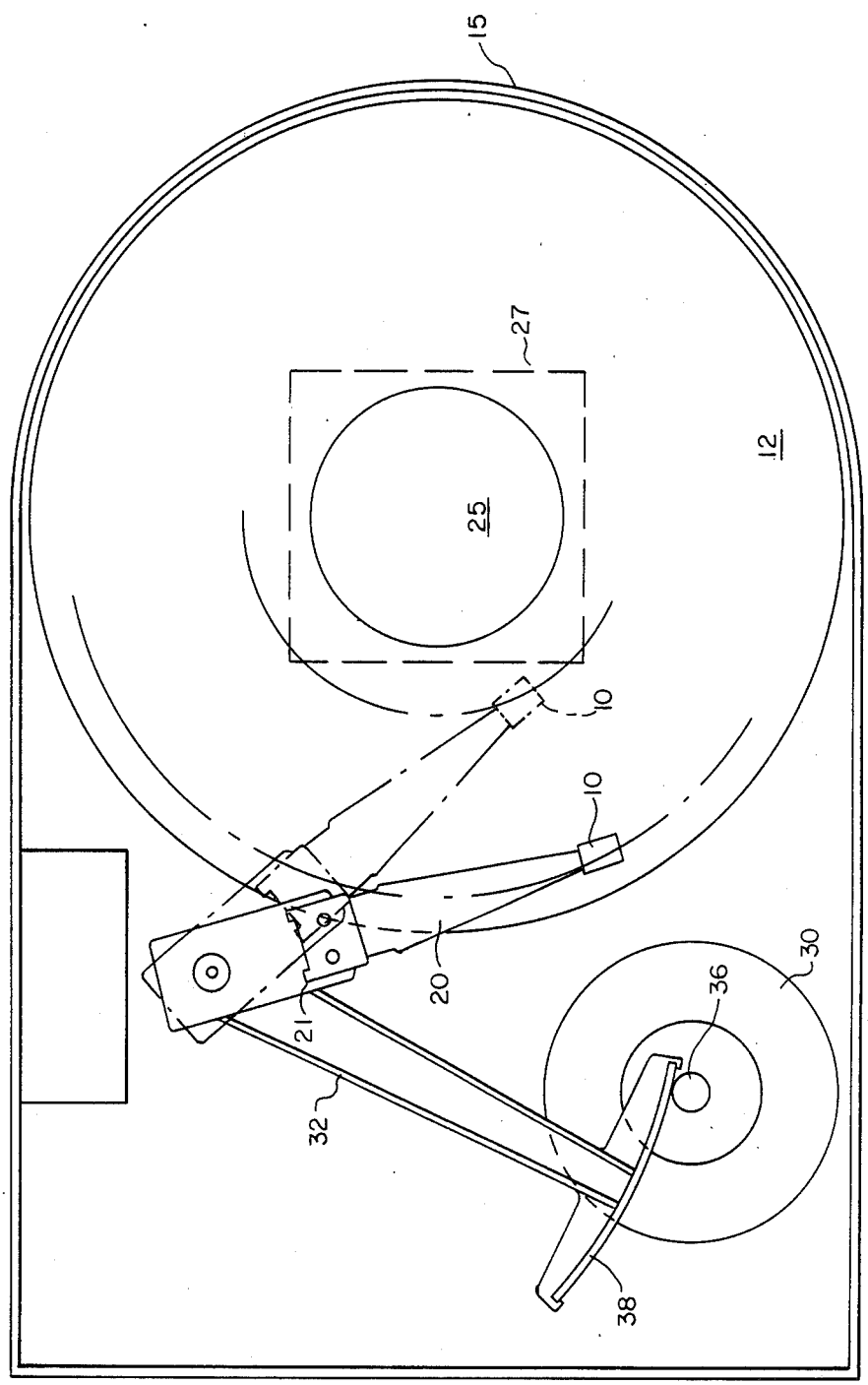
FIG.—1B

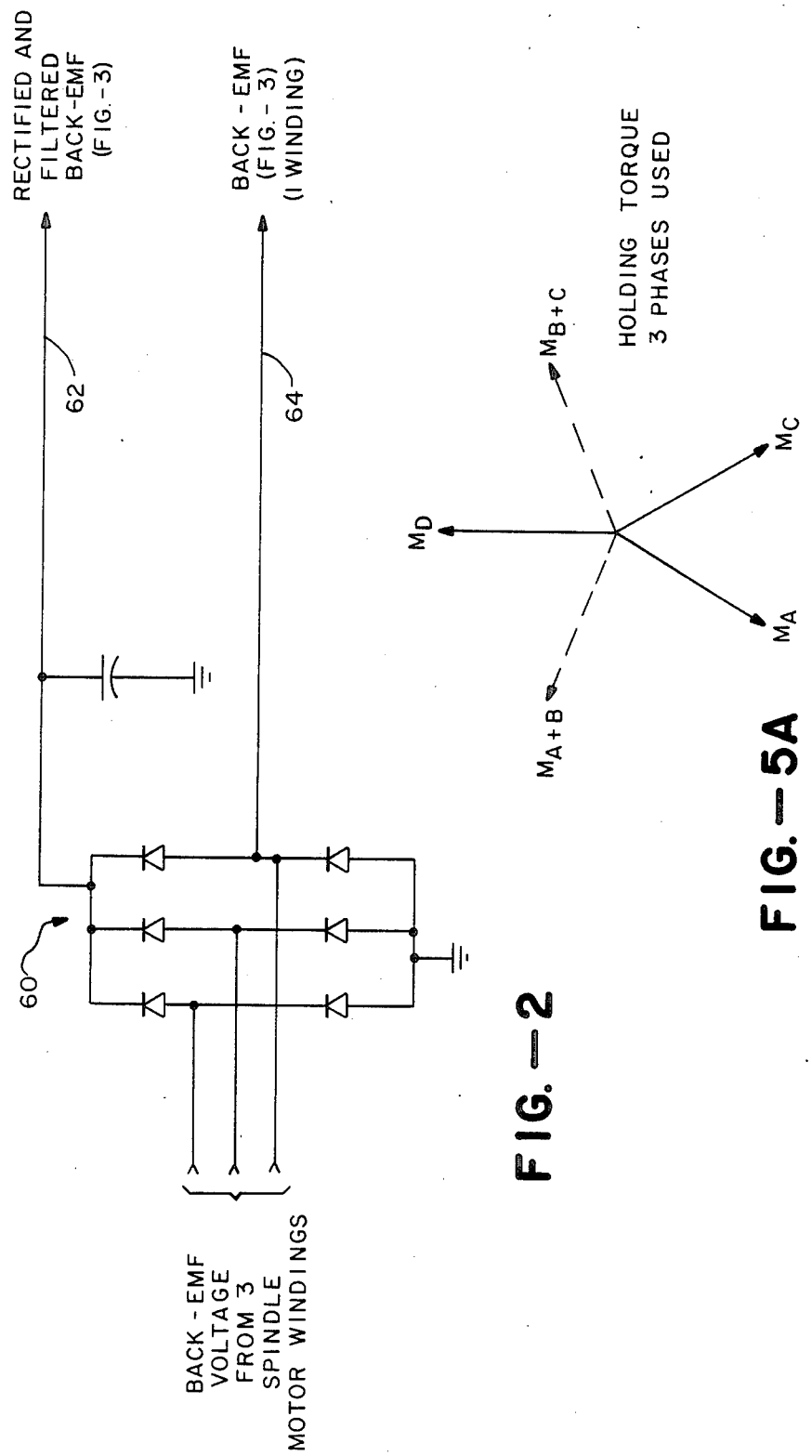

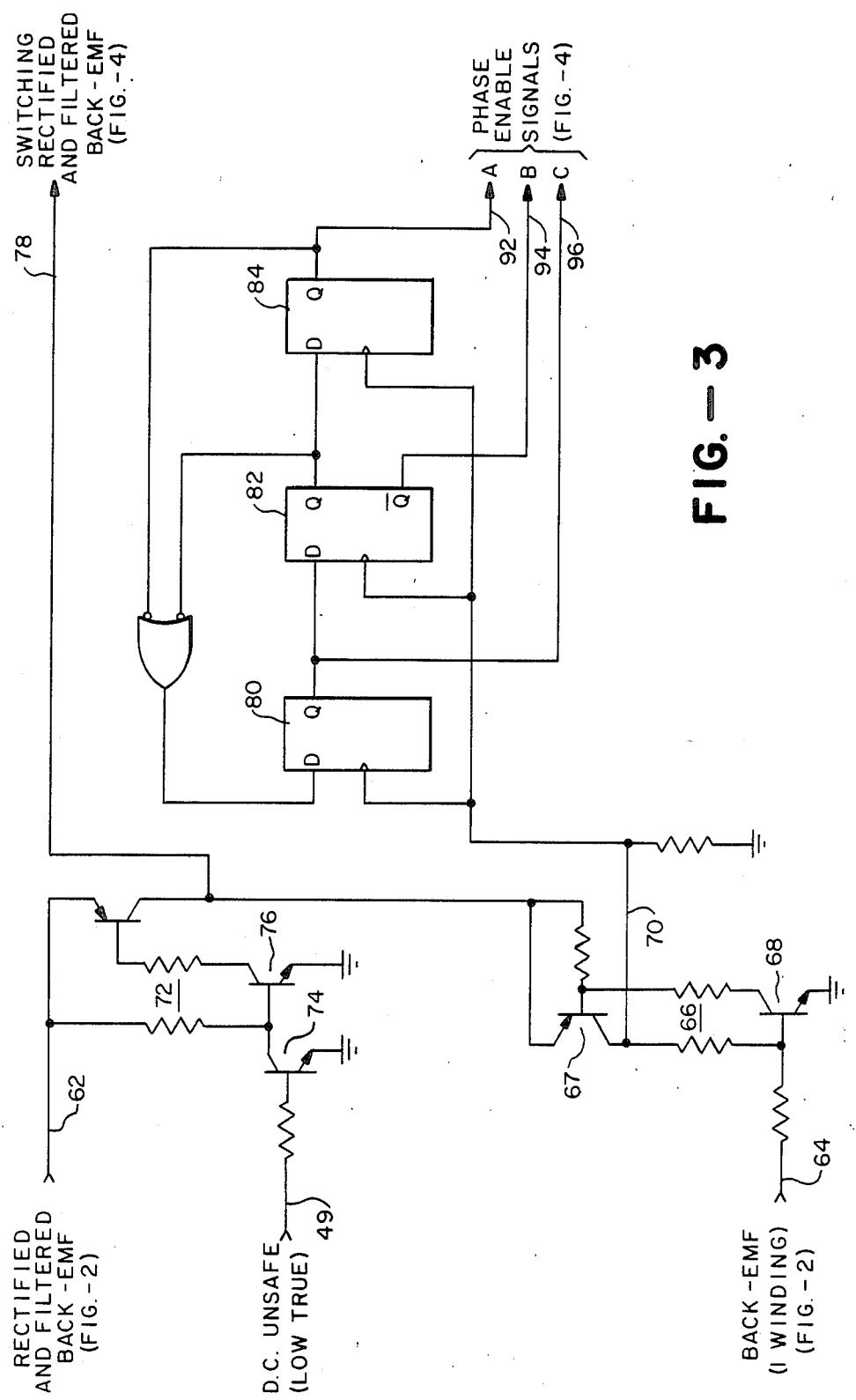
FIG.—3

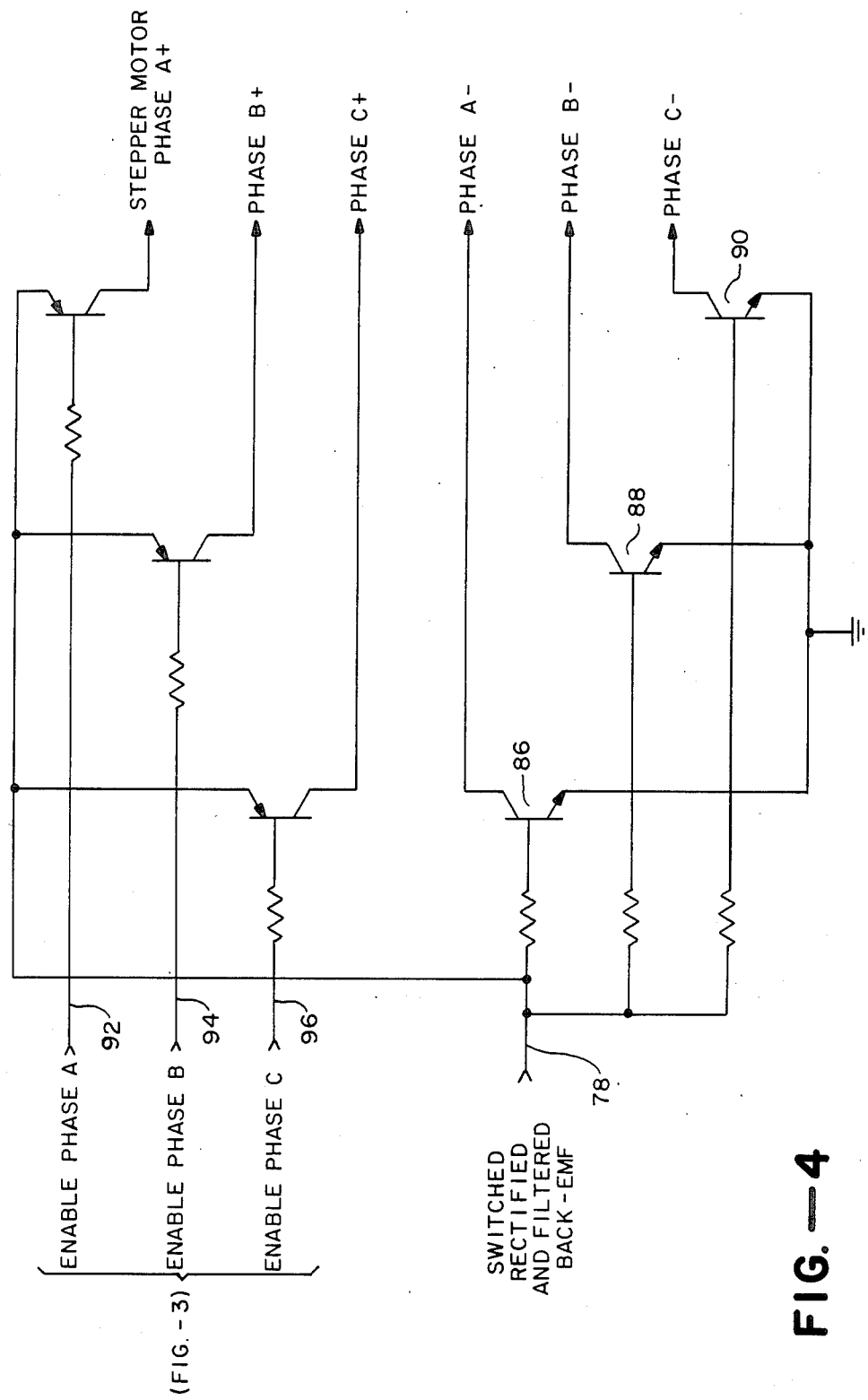
FIG.—4

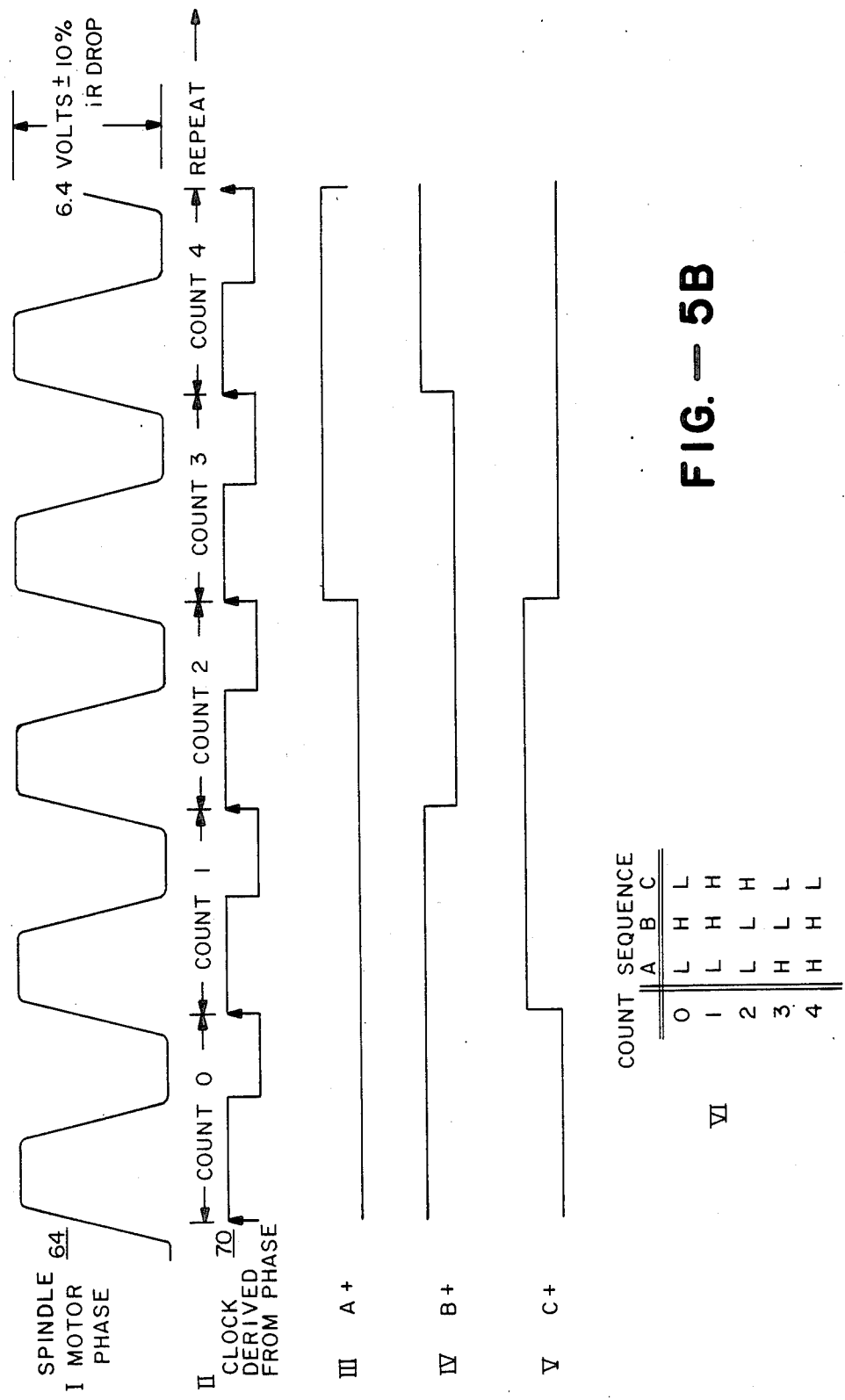
FIG.—5B

METHOD AND MEANS FOR PARKING READ/WRITE HEADS IN A DISC DRIVE USING THE BACK-EMF OF THE SPINDLE MOTOR TO OPERATE A STEPPER MOTOR

This invention relates generally to a position control system and method for use in a disc drive for positioning a transducer array relative to discs and more particularly for method and apparatus for parking the transducer array in a defined landing area relative to the surface of a disc when power is removed from the disc drive.

The present invention is intended to provide a new and useful circuit for parking the read/write transducer in a disc storage apparatus utilizing a stepper motor actuator. Such a circuit is particularly useful in a magnetic memory storage apparatus of the type known as a Winchester magnetic disc memory storage apparatus. In disc drives of this type, an actuator is typically provided, situated adjacent the peripheries of several vertically spaced discs. The actuator is designed to rapidly position the transducers to access recorded disc information.

The transducers normally comprise floating read/write heads which fly on an air bearing over the surface of the disc. It should be noted that although the present invention is described as used in a Winchester disc drive unit, and with a particular type of stepper motor for that unit, it will be appreciated that the invention is useful in other types of disc drives and electromechanical storage apparatus. The invention may also be useful in optical memory storage apparatus wherein an optical transducer or several optical transducers are incorporated in the actuator, provided that it is desirable to park the heads in a defined position whenever the drive power source is removed.

In Winchester disc drives, it is desirable to park the read/write heads in a defined landing area on the surface of the disc to prevent possible damage to the recorded data. This landing area is typically at the inner area of the disc. This parking feature, along with mechanical latches, has long been provided on disc drives with voice coil actuators to prevent the read/write head from moving across the recording media during power off conditions. Such movement, if allowed, could cause damage to both the heads and the discs and recorded data.

An advantage of the use of such a parking circuit for the transducer heads is that by moving the heads to the inside diameter of the disc, less torque is required to start the spindle motor when power is applied.

Many disc drives which use stepper motors to position the read/write heads on fixed media, Winchester type disc drives, do not automatically move the read/write heads to a landing zone when power is removed from the drive. Although a stepper motor has sufficient holding torque even when not powered to eliminate the need for a mechanical latch, the arguments for ensuring data integrity and reducing starting torque requirements still hold true in stepper motor actuator drives.

It is an objective of this invention to provide a parking circuit useful in a disc drive where the actuator is positioned by a stepper motor.

It is another objective of this invention to provide electronic circuitry to position the read/write heads in a designated landing zone when the electrical power is removed from the drive. According to the present invention, when power is removed from the drive, the stored energy of the rotating spindle motor is used as a source of electrical power and timing pulses to the stepper motor which drives the actuator of the disc drive. The power generated by the spindle motor as it spins down is referred to as "back EMF." A sequencer circuit is provided to couple the power and clock pulses to selected windings of the stepper motor in an order which will cause the stepper motor to rotate in the direction necessary to move the transducer heads to a predetermined park position at the inner diameter of the disc whenever power is removed from the disc drive. Since the location of the heads at power down may not be known, the timing of the pulses is such that a sufficient number of steps will be taken to move the transducer heads to the parking zone within the time alloted even if power down occurred when the heads were at the outermost track. Step pulses will continue to be generated until the back EMF of the spindle motor is insufficient to generate such pulses. After the transducer heads are at the predetermined parking location, any additional steps will cause the actuator to contact a mechanical "inner crash stop" designed to prevent damage to the transducer heads from contact with the clamp which retains the discs.

More specifically, when DC power to the disc drive is removed, an existing signal "DC UNSAFE" goes true. The negative going "DC UNSAFE" signal enables control circuitry to cause the stepper motor sequencer to drive the appropriate phases of the stepper motor and move the transducer heads to the landing zone. In the embodiment of the invention disclosed herein, only selected stepper motor phases are driven to perform the operation. The phases are driven in a unipolar manner by conventional transistors turned on and off by the sequencer circuit in response to a clock signal derived from the back EMF voltage of one spindle motor winding. By driving selected phases of the stepper motor, and using the spindle motor as both a power source and a clock source, the power down stepper retract circuitry of the present invention economically positions the read/write heads in a landing zone which will protect the recorded data. This also reduces the starting torque requirements which the spindle must provide when power is restored to the disc drive.

The present invention can be best understood with reference to the following figures, wherein:

FIG. 2 is a schematic of that portion of the circuitry of the present invention which converts the analog back EMF signals from the spindle motor into digital signals;

FIG. 3 is a schematic of the circuitry and logic elements of this invention which monitor the DC UNSAFE condition and sequentially enable the selected stepper motor phases;

FIG. 4 is a schematic of the stepper motor driver circuitry of this invention; and FIG. 5A is a holding torque vector diagram; FIG. 5B I-VI show signals applied to various control leads and the sequence in which they are applied.

Figure 1A:
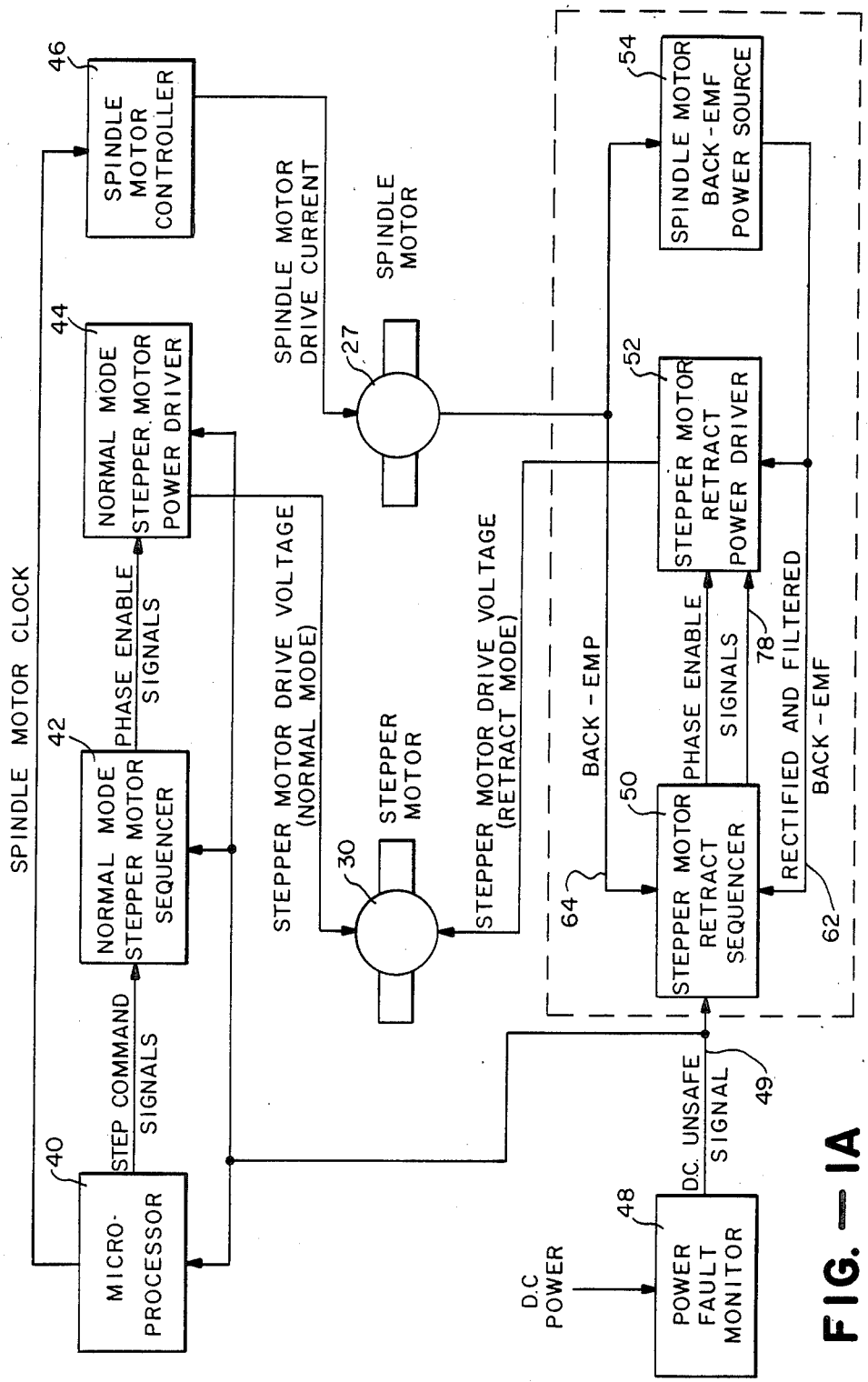
FIG. 1 is a block diagram of the basic elements of electronic control circuitry present in a typical disc drive including the stepper motor and spindle motor and the circuitry which is added to implement the present invention.
FIG. 1B is a plan view of a known type of disc drive incorporating a stepper motor actuator which may utilize the circuitry of the present invention.

Referring now particularly to the figures, wherein like elements are identified by like reference numerals, a disc drive utilizing the present invention is illustrated. Such a disc drive incorporates a spindle motor which drives one or more discs mounted on a common spindle in constant rotation. A transducer is positioned relative to the disc under the control of a stepper motor as described in U.S. Application Ser. No. 613,163 filed May 23, 1984, assigned to the Assignee of the present invention, and incorporated herein by reference. The essential elements of such a system are shown in FIG. 1B which is taken from that patent application and comprise one or more discs 12 mounted on a hub 25 for rotation by a spindle motor 27 mounted to a baseplate 15, in a manner well known in the art. The discs are accessed using a transducer head 10 mounted on a flexure 20 attached to a movable actuator. The transducer is repeatably positioned relative to any one of the tracks under the action of a stepper motor 30 which is coupled to the actuator arms 32, 20 through a flexible band 38 which winds and unwinds on the stepper motor shaft 36 with rotation of the stepper motor 30.

The electronics which are normally incorporated in a disc drive of this type are shown at the top of FIG. 1A. These electronics include a microprocessor 40 which provides the positioning commands to a stepper motor sequencer 42 which enables the stepper motor power drivers 44 which provide power to various selected phases of a stepper motor 30. The spindle motor 27 is being driven in constant rotation by the spindle motor controller 46.

When DC power is removed from the disc drive, an alarm signal "-DC UNSAFE" which is the output of the power fault monitor 48 (typically standard part of a disc drive) goes true. This disables the normal stepper motor control circuitry 40, 42, 44 and enables the stepper motor retract sequencer 50 and the stepper motor retract power driver 52. Details of the sequencer 50 are shown in FIG. 3 and of the retract power driver are shown in FIG. 4. These will be discussed in some detail below.

The spindle motor back EMF power source 54, details of which are shown in FIG. 2, is provided because by definition DC power from the normal power source is not available. The stepper retract circuitry of the present invention therefore uses the back EMF from the still spinning spindle motor 27 to power the stepper retract circuits. This back EMF is sufficient to drive the circuitry for from three to five seconds after DC power is removed because of the momentum of the spinning discs. Therefore, a back EMF voltage can be taken from the spindle motor windings and applied to the rectification circuit 60 shown in FIG. 2.

The output of this circuit comprises a rectified and filtered power signal which is applied on line 62 to the retract sequencer 50 of FIG. 3. The signal from one of the three spindle motor windings is connected directly through to the sequencer 53 on line 64.

This signal on line 64 shown in FIG. 5B I is applied to the circuit 66 in the lower left-hand portion of FIG. 3; this circuit comprises two transistors 67, 68 which convert this analogue wave form from the spindle motor to the necessary digital clock signal which goes out on line 70 to clock the flipflops 80, 82, 84 on the upper right of FIG. 3.

At the upper left of FIG. 3 appears a transistor switch 72 including a pair of transistors 74, 76 whose state is controlled by the DC UNSAFE signal on line 49 from the power fault monitor 48. A change in state of the "DC UNSAFE" signal which is indicated by the unsafe signal going low allows the rectified and filtered back EMF on line 62 to power the sequencer and the retract motor power driver on line 78.

The sequence in which the selected phases of the stepper motor 30 are enabled is determined by the logic elements comprising the flipflops 80, 82, 84 and associated circuits shown on the right side of FIG. 3. It is the change in state of these three flipflops as timed by the clock signal on line 70 that shifts the enabling signals from one phase to another of the motor. The sequence is fixed to drive the carriage to the fixed, "park" position at the inner diameter of the disc. To minimize component count, it has been determined that in the disclosed embodiment only three stepper motor phases need to be used to perform the parking operation. These three phases are represented on the right-hand side of FIG. 4, the retract power driver 52. It can be seen that one of the two ends of a winding incorporated in each phase is coupled to the power signal which is established by the rectified and filtered back EMF and provided on line 78. Therefore, one end of each of these windings is constantly driven in a unipolar manner by conventional transistors 86, 88, 90. The motor phase enabled at any given time is defined by the phase enable lines 92, 94, 96, whose state is defined by the sequencing logic shown on the right side of FIG. 3.

As the clock signals are created on line 70 see FIG. 5B II, the logic is set up so that when the clock is running the sequencer produces a sequence of signals as shown in FIG. 5B which appear on the respective control lines 92, 94, 96 running to phases A, B, C, the signals having a timed relationship shown in FIG. 5B III, IV, V. The sequence repeats every five clock cycles as shown in FIG. 5B VI. The resulting sequence of holding torque vectors given by driving an exemplary 10-phase stepper motor in this manner is shown in FIG. 5A.

In summary, by driving only three phases of the stepper motor, and using the momentum of the spindle motor (which continues to spin after DC power is eliminated) as both a power source and a clock source by tapping the back EMF off one winding for the clock source and off a plurality of windings for the power source, power down stepper retract circuitry can be provided. This circuitry is enabled only when power is removed from the disc drive. It economically positions the read/write transducer heads in a landing zone at the inner diameter of the discs and thereby protects the recorded data. This also reduces the starting torque requirements which the motor must meet.

Other features and advantages of this invention may become apparent to a person of skill in the art who studies the subject invention disclosure. Therefore, the scope of this invention is to be limited only by the following claims.

What is claimed:

1. In a disc drive comprising a plurality of discs mounted for rotation within a disc drive housing, a spindle motor for driving said discs in rotation, an actuator for reciprocatably driving a transducer array relative to the discs, said actuator including a carriage for said transducer array and a stepper motor drivingly connected to the carriage for positioning the carriage and transducer array relative to the discs and a circuitry for detecting removal of power, means for parking the transducer array at a defined park position relative to the discs after power is removed from the drive comprising circuitry for disabling normal stepper motor control and a stepper motor retract sequencer circuit coupled between the spindle motor and selected windings of the actuator stepper motor and responsive to an output of said spindle motor to energize said windings of the stepper motor to move the transducer array to a defined position.

2. A disc drive as in claim 1 wherein said sequencer circuit comprises a clock circuit responsive to an output of a winding of the spindle motor to step said stepper motor a number of steps necessary to park said transducer array at a defined position, and wherein the circuitry responsive to removal of power from said disc drive activates said sequencer circuit.

3. A disc drive as in claim 1 wherein said spindle motor generates a back EMF when DC power to the drive is removed, said stepper motor retract sequencer circuit comprising means for coupling said generated back EMF to selected phases of said stepper motor to cause said stepper motor to move said transducer array to said park position, the circuitry responsive to removal of power from said disc drive activating said sequencer circuit.

4. A disc drive as in claim 3 wherein said sequencer circuit includes coupling means for rectifying and filtering said back EMF and coupling said back EMF to the windings of said stepper motor.

5. A disc drive as in claim 4 wherein outputs of said coupling means of said sequencer circuit are connected to one end of said windings of said stepper motor, said sequencer circuit further including a clock circuit responsive to an output of a winding of said spindle motor to generate a sequence of clock pulses, the output of said clock circuit being coupled to the other end of said windings to energize said windings.

6. A disc drive as in claim 5 wherein said generated back EMF and the output of said clock circuit is coupled to at least two windings of said stepper motor.

7. A disc drive as in claim 2 or 3 having an external DC power supply to said disc drive motors, means for generating a signal indicating the presence of said DC power supply, said sequencer circuit being responsive to said signal generating means to initiate actuator movement to the defined park position, said defined position being generally at the inner portion of said discs and inside the diameter of the innermost data track.

8. A disc drive as in claim 7 wherein said sequencer circuit is responsive to a change in state of an output of said signal generating means to initiate the defined movement of said actuator.

9. In a data storage device including a frame, a data storage disc supported on a spindle for rotation within a frame and rotationally driven by a spindle motor at constant velocity, the disc being characterized by a multiplicity of concentric tracks on a surface thereof, at least one data transducer head structure mounted in close proximity to said disc track surface, and an actuator assembly for positioning said transducer head structure relative to the tracks comprising a carriage mounting said transducer head structure at one end thereof and a stepper motor coupled to the carriage for positioning the carriage and head structure relative to the tracks, and a DC power supply for said motors, the improvement comprising a sequencer circuit coupled between the spindle motor and selected windings of the actuator stepper motor and responsive to an output of said spindle motor to energize the windings of the actuator stepper motor to move the actuator to a defined position, and a control signal generator responsive to the absence of an output from said DC supply to said motors to activate said sequencer circuit.

10. A data storage device as in claim 9 wherein said sequencer circuit includes means for deriving a clock signal and means for generating a power signal from back EMF generated by said rotating spindle motor to selectively energize the windings of said stepper motor.

11. A device as in claim 10 wherein said means for generating a power signal comprises means for coupling the back EMF of said spindle motor to selected windings of said stepper motor.

12. A device as in claim 11 wherein the output of the means for generating a power signal is coupled to one end of said selected windings of said stepper motor, the output of said clock signal generating circuit being coupled to the other end of said selected windings to selectively activate said windings and cause said stepper motor to position said carriage.

13. A device as in claim 12 wherein said generated back EMF and the output of said clock circuit is coupled to at least two windings of said stepper motor.

14. A device as in claim 13 wherein said sequencer circuit is responsive to a change in state of an output of the means for generating a power signal to initiate the defined movement of the actuator.

15. A device as in claim 14 wherein said clock circuit comprises means for converting said back EMF signal to a digital clock signal for selectively activating windings of said stepper motor.

16. A device as in claim 9 wherein said defined position is generally at the inner portion of said disc and inside the diameter of the innermost data track.

* * * * *